March 31, 1953
LE ROY O. KITTELSON
2,632,944
PROCESS FOR CONTROLLING WARPAGE
IN IRON CASTINGS DURING WELDING
Filed Sept. 18, 1950
2 SHEETS—SHEET 1
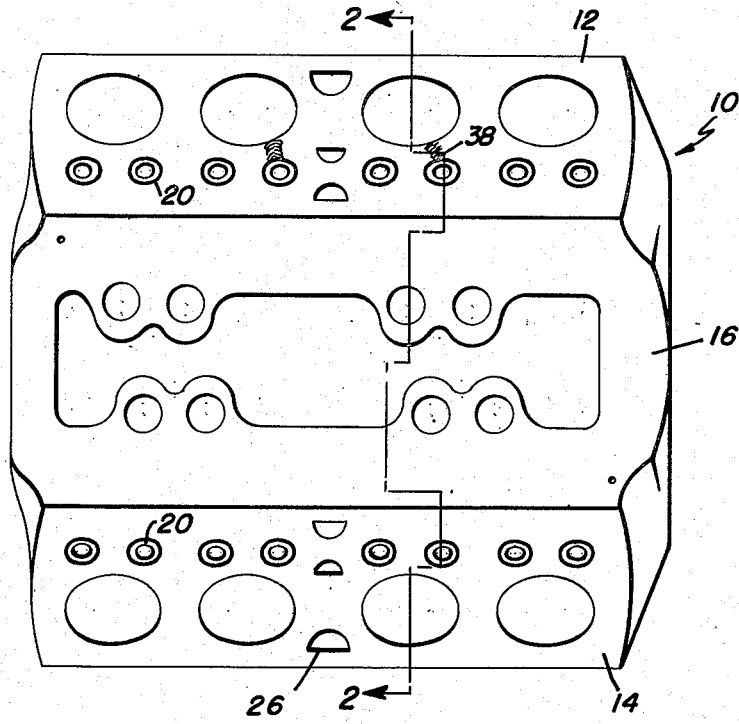
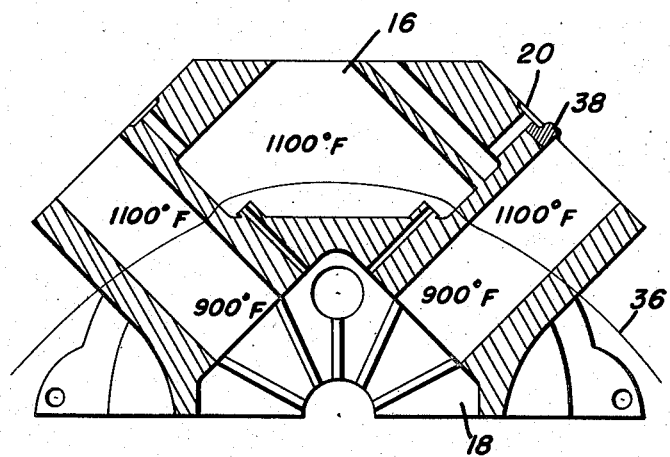
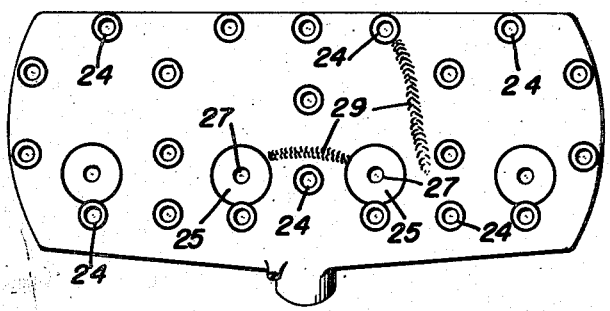
LeRoy O. Kittelson
INVENTOR.

March 31, 1953 LE ROY O. KITTELSON 2,632,944
PROCESS FOR CONTROLLING WARPAGE
IN IRON CASTINGS DURING WELDING
Filed Sept. 18, 1950 2 SHEETS—SHEET 2

LeRoy O. Kittelson
INVENTOR.

Patented Mar. 31, 1953

2,632,944

UNITED STATES PATENT OFFICE 2,632,944

PROCESS FOR CONTROLLING WARPAGE IN IRON CASTINGS DURING WELDING

Le Roy O. Kittelson, Tracyton, Wash., assignor to Engineering Development Corporation, Bremerton, Wash., a corporation of Washington Application September 18, 1950, Serial No. 185,461

4 Claims. (Cl. 29—359)

This invention relates to a process of welding cracks in cast iron, and particularly for welding cracks in cast iron engines, engine blocks, cylinder heads, valve seats, and so forth.

Heretofore, the welding of engine blocks, cylinder heads and valve seats in automotive vehicles has met with many difficulties. The primary difficulty encountered is the warpage of important parts of the engine due to weld shrinkage so that after the weld is made, considerable distortion results. Thus, for example, when employing the conventional methods of welding cracks in valve seats found in the top portions of blocks, the bottom portion of the block usually becomes considerably twisted so that the crank shaft and the cam alignments become unnecessarily distorted. Such distortions occur particularly with the V-8 type of block. When welding cylinder heads in the conventional manner, it is well known that the gasket surface becomes warped to a degree beyond which it could be resurfaced.

Accordingly, it is the primary object of the present invention to provide a process which will permit the welding of substantial cracks in virtually all portions of an engine without the attendant warpage of the important parts of the engine due to weld shrinkage.

It is another important object of this invention to provide a welding process of the character described which materially reduces the cost of welding and which can be carried out with a rapidity and efficiency not heretofore possible. It should be remembered that a process of welding engines must not only be effective, but must also be carried out quickly and inexpensively to be commercially successful.

A further object of this invention is to provide a welding process which not only reduces or entirely eliminates warpage and distortion due to weld shrinkage but also requires a minimum of manipulation and is very effective for welding cracks in portions of the engine which have heretofore been difficult or impossible to weld because of the necessity of maintaining the warpage at a minimum.

The details of the process can best be described in connection with the accompanying drawings, wherein:

Figure 1 is a plan view of a V-type block;

Figure 2 is a sectional view taken substantially on the plane of section line 2—2 of Figure 1;

Figure 6 is a plan view of the back or top surface of the cylinder head shown in Figure 5.

In referring to the drawings, as the following description proceeds relative to the process, similar reference characters will indicate corresponding elements throughout the description.

The present process comprises preheating the entire engine at a temperature of approximately 900° F. and then preheating a confined area surrounding the crack to be welded at a temperature of 1100° to 1600° F. Inasmuch as it is contemplated that the gas weld process will be employed using a cast iron filler rod for making the weld, a preheating torch burning compressed air and a suitable fuel, such as diesel oil, will be employed for the preheating steps. Before the preheating and welding, it will be understood that the engine is completely stripped and thoroughly cleaned and inspected. After the steps of preheating have been accomplished, the crack is welded with cast iron and the entire engine and the confined area, after the welding, are again heated to 900° F. and 1100° to 1600° F., respectively, for a short time, in the neighborhood of a few minutes, and then the entire engine is allowed to cool slowly until it comes to room temperature.

This process materially reduces or substantially eliminates all warpage due to weld shrinkage because the preheating of the confined area surrounding the weld upsets the grain growth of the cast iron. As an example of what occurs at the preheating stage, if a rod of cast iron measuring approximately 36 inches in length is heated to approximately 1500° F., it would expand to 37 inches. Moreover, after it had been cooled slowly to room temperature, it would measure approximately 36½ inches. Therefore, when the cast iron weld is applied to the crack to be repaired, since the confined area immediately surrounding the crack is retained at the elevated temperatures of 1100–1600° F. before and for some time after the weld is applied, the shrinkage of the weld will be compensated by the grain growth of the cast iron around the crack, thus preventing warpage of the engine adjacent the area of the crack.

Figure 5:
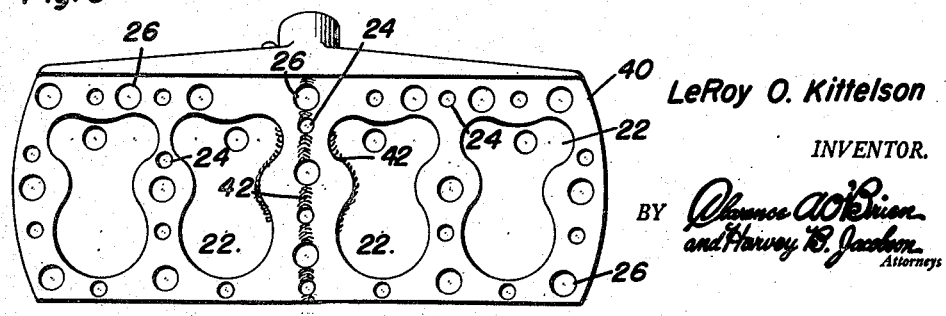
Figure 5 is a plan view of the under side of a V-type head.

The accompanying drawings illustrate the various applications of the above-described process in the welding of certain parts of engines. Indicated generally at 10 is a V-type engine block having opposed inclined faces 12 and 14. The valve chamber well is shown at 16, whereas the crankcase chamber is shown at 18. Indicated at 20 are the valve seats, and as shown in Figures 5 and 6 illustrating the head, the combustion chamber is shown at 22, the stud holes at 24, the spark plug wells at 25, the spark plug holes at 27, and the water passages at 26. The center main bearing support is shown at 28.

Figure 3:
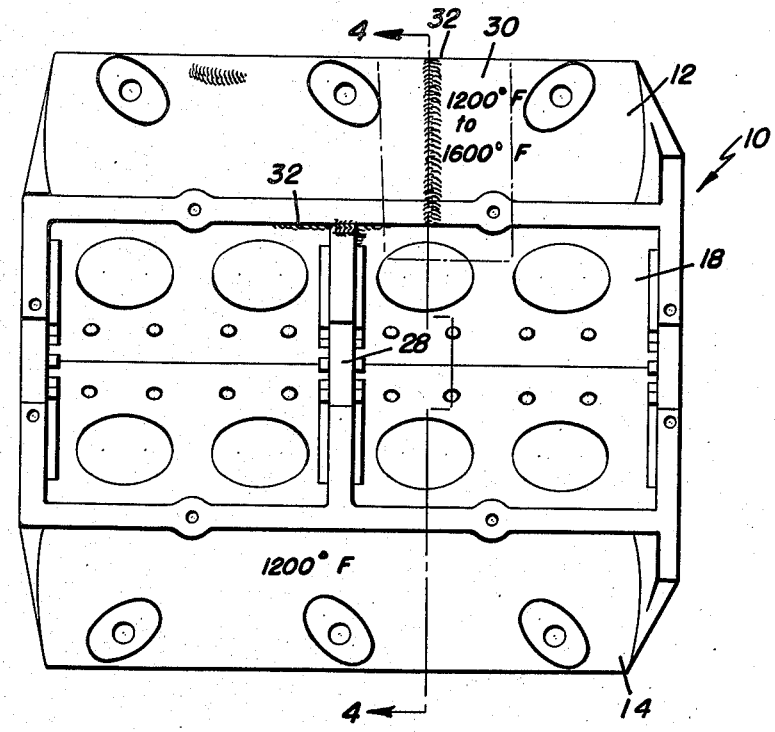
Figure 3 is a bottom plan view of a V-type block.
Figure 4:
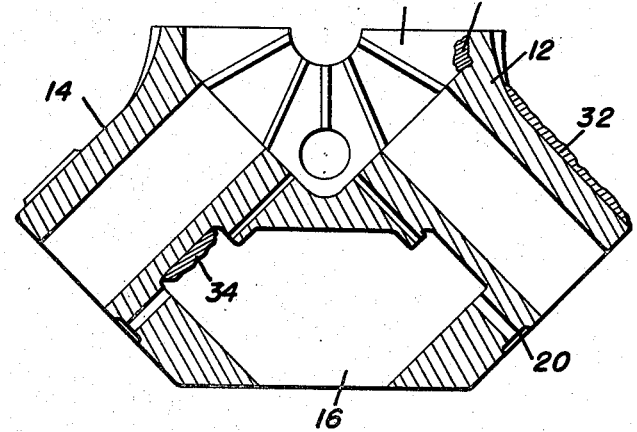
Figure 4 is a sectional view taken substantially on the plane of section line 4—4 of Figure 3.

To weld cracks in one of the inclined faces 12 of the block and in a crack in the block adjacent the center main bearing support, see Figures 3 and 4, the entire block is heated, by any suitable means, but preferably with the gas weld preheating torch, to a temperature of approximately 900° F. A confined area 30 surrounding the cracks, preferably occupying a space of from six to eight inches from the sides and ends of the crack, is then heated to a temperature of 1100 to 1600° F., although the range of 1200 to 1600° F. is preferred. Thereafter, the crack is welded as at 32, using a cast iron filler rod. After the welding has been completed, the entire block is again reheated to a temperature of 900° F. for a few minutes and allowed to cool slowly to room temperature. It has been found that some advantage is obtained by also reheating, after the welding, the confined area 30 about each crack to the previous preheat temperatures of 1100 to 1600° F. After the block has attained room temperature, it has been found that there is virtually no warpage in the block anywhere, and particularly in the vicinity of the welds 32.

To effectively weld a crack in the block at the valve chamber 16 as shown at 34, it has been found that not only does the entire block have to be heated to the temperature of 900° F., but the entire inclined face 14 must be heated to a temperature of 1100 to 1600° F., preferably 1200° F., before the cast iron weld 34 is applied to the crack. Otherwise, some distortion would occur, necessitating replaning all plain surfaces and line boring the cam and crank shaft alignment. After the weld 34 is applied to the crack, the entire surface 14 is immediately reheated to the preferred temperature of 1200° F., with the remainder of the block remaining at a temperature of 900° F. It has been found that cracks in the block at the valve chamber 16 have been effectively welded by the present process in as little as twenty-five minutes.

It is known in the art that it is particularly difficult to weld cracked valve seats on V-type blocks and even on other type blocks. Aside from warpage due to weld shrinkage, porosity and hard spots appear in and adjacent the valve seats. Accordingly, as particularly shown in Figure 2, the top half of the block above the dividing line 36 is preheated to a temperature of approximately 1100° F., while the bottom half of the block below the dividing line 36 is preheated to a temperature of approximately 900° F. This prevents twisting of the block. Thereafter, the cast iron weld 38 is applied to the crack in the valve seat 20, and after the welding has been completed, the top half of the block is again reheated to a temperature of 1100° F. and the bottom half of the block to a temperature of 900° F. for a few minutes before the block is slowly cooled to room temperature. This welding is very effective, does not distort the valve chamber in any way, and can be completed in a relatively short time.

As will be readily apparent to those skilled in the art, the above-described process may also be applied effectively to the repair of cracks in cylinder heads 40. Employing the conventional processes using the ordinary preheat methods, the gasket surface of the cylinder head would be warped to a degree beyond which it could be resurfaced. The present process effectively overcomes this disadvantage. Cracks in cylinder heads may occur in various places but usually occur between the stud holes and the water chambers and in the head adjacent the combustion chamber 22. The cylinder head is preheated to a temperature of 900° F., while a confined area immediately surrounding the crack is heated to a temperature of 1100° to 1600° F. Then, the cast iron weld 42 is applied and after the welding, the entire head is reheated for a few minutes to a temperature of approximately 900° F. before the head is allowed to cool slowly to room temperature. If desired, the confined area may also be reheated to the previous temperature of 1100° to 1600° F., while the remainder of the head is maintained at a temperature of approximately 900° F. before slow cooling to room temperature. This process is particularly effective in applying welds, such as 29, to cracks on the top surface of a cylinder head, especially cracks between spark plug wells 27 and between stud holes 24. Because of the excessive warpage which results, welders rarely attempt to repair such cracks. However, employing the process set forth immediately hereinabove, the warpage is reduced to a minimum or even entirely eliminated.

Thus, it will be seen that a novel process is provided which is effective for welding all types of cracks in engine blocks, valve seats, cylinder heads, valve chambers, and so forth. The process is simple to carry out, requires no expensive apparatus beyond the normal welding apparatus, can be quickly performed, and is very effective in preventing warpage and distortion due to weld shrinkage so that it becomes unnecessary to replane or resurface any substantial areas of the block at the completion of the welding process.

While preferred embodiments of the invention have been shown and described hereinabove, it will be understood that those skilled in the art may make minor variations in the process without departing from the spirit of the invention and the scope of the appended claims.

Having described the invention, what is claimed as new is:

1. The process of welding a cast iron engine block having a crack in the upper portion thereof comprising preheating the entire engine block to a temperature of approximately 900° F. and then preheating a substantial portion of the upper portion of the engine block in the vicinity of the crack to a temperature of 1100–1600° F., whereby the metal in the vicinity of the crack is sufficiently heated to prevent stressing due to weld shrinkage and at the same time the temperature of bearing surfaces in the lower portion of the block is insufficient to warp said surfaces, welding the crack in the engine block, post heating the entire block to a temperature of approximately 900° F. and the portion of the block in the vicinity of the weld to a temperature of 1100–1600° F., and allowing the engine block to slowly cool.

2. The process of welding a cast iron engine block having a crack in the upper portion thereof comprising preheating the entire engine block to a temperature of approximately 900° F. and then preheating a confined area which occupies a space of from 6 to 8 inches from the sides and ends of the crack to a temperature of 1100–1600° F., whereby the metal in the vicinity of the crack is sufficiently heated to prevent stressing due to weld shrinkage and at the same time the temperature of bearing surfaces in the lower portion of the block is insufficient to warp said surfaces, welding the crack in the engine block, post heating the entire block to a temperature of approximately 900° F. and the portion of the block in the vicinity of the weld to a temperature of 1100–1600° F., and allowing the engine block to slowly cool.

3. The process of welding a cast iron engine block having a crack in a valve seat in the top of the engine block comprising preheating the entire engine block to a temperature of approximately 900° F. and then preheating a substantial portion of the upper portion of the engine block in the vicinity of the crack to a temperature of 1100–1600° F., whereby the metal in the vicinity of the crack is sufficiently heated to prevent stressing due to weld shrinkage and at the same time the temperature of bearing surfaces in the lower portion of the block is insufficient to warp said surfaces, welding the crack in the engine block, post heating the entire block to a temperature of approximately 900° F. and the portion of the block in the vicinity of the weld to a temperature of 1100–1600° F., and allowing the engine block to slowly cool.

4. The process of welding a cast iron engine block having a crack in a valve seat in the top of the engine block comprising preheating the entire engine block to a temperature of approximately 900° F. and then preheating a confined area which occupies a space of from 6 to 8 inches from the sides and ends of the crack to a temperature of 1100–1600° F., whereby the metal in the vicinity of the crack is sufficiently heated to prevent stressing due to weld shrinkage and at the same time the temperature of bearing surfaces in the lower portion of the block is insufficient to warp said surfaces, welding the crack in the engine block, post heating the entire block to a temperature of approximately 900° F. and the portion of the block in the vicinity of the weld to a temperature of 1100–1600° F., and allowing the engine block to slowly cool.

LE ROY O. KITTELSON.

REFERENCES CITED

The following references are of record in the file of this patent:

UNITED STATES PATENTS

| Number | Name | Date |
| --- | --- | --- |
| 1,777,531 | Peterson | Oct. 7, 1930 |
| 2,229,405 | Currier | Jan. 21, 1941 |

OTHER REFERENCES

Weld. Journal, June 1947, pp. 504–508, Weld. of Heavy Gray Iron Castings.